United States Patent [19]

Vielhaber et al.

[11] Patent Number: 5,359,011
[45] Date of Patent: Oct. 25, 1994

[54] PROCESS FOR THE COMPLETE NEUTRALIZATION OF CHLORINATED POLYVINYL CHLORIDE AND PRODUCT RESULTING THEREFROM

[75] Inventors: Robert G. Vielhaber, Avon, Ohio; Raymond W. Ballman, Jr., Louisville, Ky.

[73] Assignee: The B.F. Goodrich Company, Akron, Ohio

[21] Appl. No.: 960,654

[22] Filed: Oct. 14, 1992

[51] Int. Cl.$^5$ ................................................ C08F 8/42
[52] U.S. Cl. ................................ 525/366; 525/331.6; 525/340; 525/356
[58] Field of Search ......................... 525/340, 366, 356

[56] References Cited

U.S. PATENT DOCUMENTS 3,440,236  4/1969  Foster et al. .
3,551,400  12/1970  Yonezu et al. .
4,373,093  2/1983  Olson et al. .
4,374,205  2/1983  Hall .
4,412,898  11/1983  Olson et al. .

FOREIGN PATENT DOCUMENTS 0107063  5/1984  European Pat. Off. .
200889  6/1983  German Democratic Rep. .
257072  1/1987  German Democratic Rep. .
67000871  12/1962  Japan .
53-12864  11/1978  Japan .
61-296004  12/1986  Japan .
62-270647  11/1987  Japan .
1131212  11/1987  Japan .
470427  9/1968  Switzerland .
494393  11/1975  U.S.S.R. .
895991  1/1982  U.S.S.R. .
977766  12/1964  United Kingdom .

*Primary Examiner*—Bernard Lipman
*Attorney, Agent, or Firm*—Helen A. Odar

[57] ABSTRACT

A novel process has been found in which effectively and completely neutralizes chlorinated polyvinyl chloride resin. The process comprises neutralizing the chlorinated polyvinyl chloride resin by a weak non-gassing base. The weak non-gassing base has a pKa less than 7.0 and is not a carbonate. The resulting chlorinated polyvinyl chloride polymer is stable and does not degrade.

4 Claims, 3 Drawing Sheets

PROCESS FOR THE COMPLETE NEUTRALIZATION OF CHLORINATED POLYVINYL CHLORIDE AND PRODUCT RESULTING THEREFROM

BACKGROUND OF THE INVENTION

1. Field of Invention

This invention relates to a process for the complete neutralization of chlorinated polyvinyl chloride and the product resulting therefrom. More particularly, this invention relates to a process for the neutralization of chlorinated polyvinyl chloride using a weak non-gassing base. In addition, the invention also relates to the improved stable chlorinated polyvinyl chloride formed by said process.

2. Description of the Art

Chlorinated polyvinyl chloride polymers (hereinafter "CPVC") are extremely useful for rigid and semi-rigid applications. For example, these polymers have been used in pipes, duct work, cable jackets, appliance parts, injection molded valve bodies, fittings, sheets for thermo-forming.

Many processes have been developed to form CPVC from polyvinyl chloride. For example, U.S. Pat. No. 4,412,898, incorporated herein by reference, discloses a process which can be used to form CPVC. However, during the formation of CPVC using any of these processes, hydrochloric acid is released during the reaction of chlorine with polyvinyl chloride. In addition, chlorine which did not react with the polyvinyl chloride is usually found along with the hydrochloric acid in the reaction vessel. If the chlorine and hydrochloric acid are not removed, the resulting CPVC resin can degrade and there may be a loss in stability of the resulting polymer. Therefore, several methods have been developed to neutralize CPVC in order to increase the stability of the polymer and prevent its degradation.

Swiss Patent No. 470,427 assigned to Lonza discloses process for the purification of chlorinated polymers. The process comprises treating the chlorinated polymer with water, methanol or ethanol or mixtures thereof together with a base. The treatment is carried out in the temperature range of 50 to 130 degrees Centigrade and pressure of 0.1 to 10 superatmospheres. The organic phrase is distilled off under pressure and the resulting polymer is washed with water and dried.

Similarly, East German Patent No. 257,072 discloses a process forming CPVC which is free of chlorine and hydrochloric acid. The process is a de-gassing process in which dry CPVC is alternatively evacuated and purged with inert gas while in dilute chlorine and fluidized in a moist gas to remove acid. More particularly, CPVC powder is cooled to about 20 to 50 degrees Centigrade after it is removed from the reactor. The CPVC is alternatively purged with nitrogen and subject to vacuum while being kept in an atmosphere of 3-5 volume percent chlorine and 95-97 volume percent inert gas for at least 30 minutes. The CPVC is then fluidized with acid or nitrogen having a moisture content less than 100% and simultaneously heated to a temperature in the range of 40 to 80 degrees Centigrade until the CPVC has a pH of 5.5 to 6.0. The CPVC is then fluidized with acid or nitrogen having a moisture content of one hundred percent until the pH of the powder is 6.1 to 6.6.

Japanese Patent No. 6,129,6004 also discloses a procedure for treating chlorinated vinyl chloride resin to remove the unreacted chlorine and the hydrogen chloride by-product of the chlorination of polyvinyl chloride. The treatment comprises washing the CPVC resin with water and filtering the resin to remove any unreacted chlorine and the hydrogen chloride by-product. The CPVC resin is then shaped into a cake and washed with pure water having a specific resistance of at least 20K Ohm. The CPVC resin is then dried.

Russian Patent No. 895,991 to Voroseva discloses a process for preparing chlorinated PVC. The CPVC prepared by the method is neutralized by sodium thiosulphate or hydrazine after the chlorinated polymer is formed.

U.S. Pat. No. 3,440,236 discloses a method for the separation of CPVC from its solution of tetrachloroethane. The CPVC of this invention is formed as a result of chlorination of polyvinyl chloride dissolved in tetrachloroethane solvent. The solution containing the CPVC is mixed with a non-solvent such as methanol in a controlled manner so as to maintain the methanol in the range of 0.25 to 0.6 by volume while at the same time adding methanol alone or in admixture with tetrachloroethane so as to maintain the volume of tetrachloroethane to methanol in the mixture within the same limits. The CPVC is then separated as a fine powder from the solution of tetrachloroethane.

U.S. Pat. No. 3,551,400 discloses a process for the manufacturing of CPVC. The CPVC polymer after it is formed is subjected to any reducing agent which is capable of reducing the chlorine and/or hypochlorous acid resulting from the chlorination of polyvinyl chloride. The CPVC is subjected to reduction before any chlorine dissolved in the CPVC or hypochlorous acid reacts with the formed CPVC. Any reducing agent can be used as long as it is capable of reducing chlorine and for the hypochlorous acid which is to be removed. The reduced CPVC resin has improved stability.

U.S. Pat. No. 4,374,205 discloses the stabilization of post-chlorinated vinyl chloride polymers by phosphate salts. In this patent, the patent teaches neutralizing the CPVC polymer after the polymer slurry is filtered or centrifuged to free it of the liquid phase and the filtered product is neutralized by the addition of water-soluble alkali such as sodium, ammonia hydroxides, carbonates and phosphates.

Although these methods are useful, there exists a need for an easy, efficient, and nonexpensive method to neutralize CPVC after its formation from polyvinyl chloride.

Accordingly a primary object of the invention is the effectively and efficiently neutralize and treat CPVC resin containing hydrochloric acid.

Another object of the invention is to easily and completely neutralize CPVC polymer.

Still another object of the invention is to neutralize acidic CPVC resin with a weak non-gassing base.

Yet another object of the invention is to produce a stable CPVC polymer without any residual acid.

Still yet an additional object of the invention is to produce a neutralized CPVC polymer.

SUMMARY OF THE INVENTION

The foregoing and other objects, advantages and features of the invention may be achieved by a method of neutralizing the CPVC polymer of the instant invention. More particularly, if weak non-gassing bases are added to the CPVC after the formation of the resin, the CPVC resin is effectively and completely neutralized. The resin neutralized using the novel method of this invention does not degrade and has increased stability as compared to CPVC neutralized by other agents and treatment methods.

DETAILED DESCRIPTION OF THE INVENTION

Figure 1:
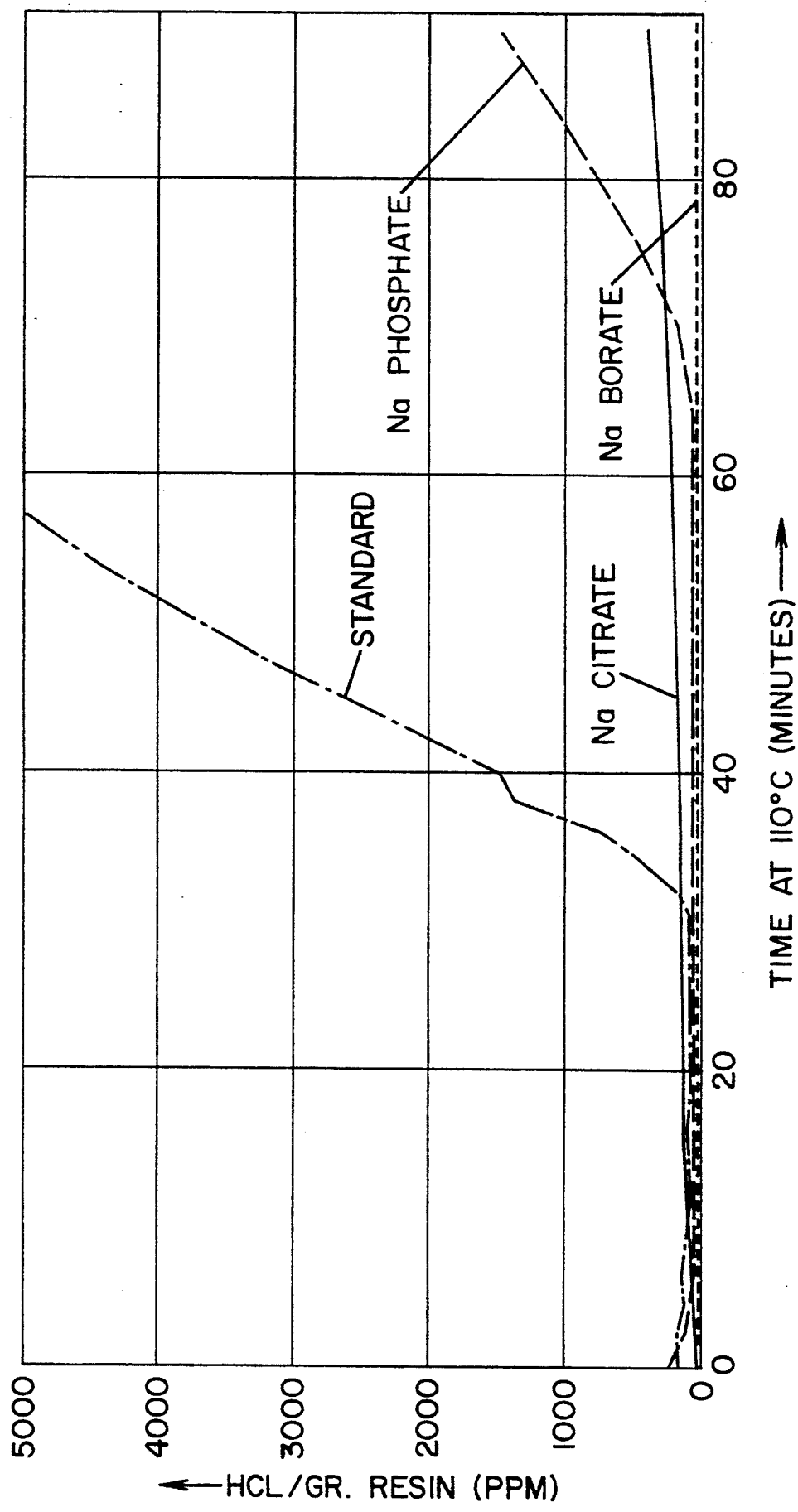
FIG. 1 shows the relationship between several neutralization agents and their effect on acid generated during chlorination of polyvinyl chloride to form CPVC.

CPVC is a useful polymer for numerous applications, in particular rigid and semi-rigid applications. CPVC is formed by the chlorination of polyvinyl chloride resin. Numerous different methods exists for the chlorination of polyvinyl chloride resin to form CPVC. However, all these methods yield hydrogen chloride as a by-product of the chlorination reaction. Moreover, unreacted chlorine may also be present in the reaction vessel after the formation of CPVC.

The unreacted chlorine and the hydrogen chloride by-product cause degradation of the resulting CPVC resin. The degradation can generally be quantified by loss in resin density. Also, the unreacted chlorine and the hydrogen chloride cause stability loss in the polymer. Therefore, the acidic polymer must be neutralized or treated to remove the residual acid and chlorine.

Various methods and agents have been used to neutralize and treat the CPVC to remove the unreacted chlorine and hydrogen chloride by-product. For example, U.S. Pat. No. 4,412,898 discloses neutralizing the CPVC resin with a aqueous solution of an alkali such as sodium carbonate. However, these methods are generally ineffective in the complete neutralization of the CPVC resin. This invention relates to a method of neutralizing a CPVC resin to obtain a stable CPVC resin which does not degrade.

The CPVC resin used in this invention is formed by the chlorination of polyvinyl chloride resin (hereinafter "PVC"). The PVC used is preferably a PVC homopolymer, in the form of solid porous macrogranules. The particular process by which the PVC homopolymer is formed, whether by suspension, emulsion or mass polymerization is immaterialized to the instant invention. Because the physical properties of the CPVC resin formed are largely dependent upon the PVC used in the polymerization, the type of PVC used is dependent upon the desired properties to be achieved in the CPVC resin. Preferably the average particle size of resin for PVC used in the process ranges from 50 microns, to 250 microns with a mercury porosity from 0.1 to 0.4 cubic centimeters per gram.

The PVC homopolymer may be chlorinated by any chlorination method which can be used to produce a CPVC resin. Preferably the method disclosed in U.S. Pat. No. 4,412,898, incorporated herein by reference, is used to form the CPVC resin. Using this preferred process, an aqueous suspension containing about 15 to about 35% by weight of PVC is introduced into a reaction vessel which is operable under elevated pressure. Essentially all oxygen is removed from the suspension. Chlorine is introduced into the reaction vessel until the pressure in the reaction vessel is in the range from about 10 psig. to about 30 psig. The PVC in the reaction vessel is then irradiated with ultraviolet light at a level in the range from about 2 watts to about 50 watts per gallon of suspension to initiate the chlorination of PVC. The temperature is ramped in the range of from about 60 degrees to about 120 degrees Centigrade; this temperature range is maintained during the chlorination process. As the reaction proceeds, chlorine is continually being introduced into the reaction vessel so that the pressure in the reactor is maintained substantially constant within the desired range of pressure. The flow of chlorine into the reactor is stopped when enough chlorine has been added to produce the desired percent chlorine of CPVC from the reactor.

According to the invention, the CPVC resin is neutralized by a neutralizing agent. The neutralizing agent is preferably a weak, non-gassing base. Weak non-gassing bases are generally non-carbonate bases with a pKa less than 7.0 wherein pKa is the negative logarithm of the acid disassociation constant. Generally, the weak non-gassing bases can be phosphates, soluble citrates, or oxidates. Examples of weak non-gassing bases include sodium citrate, potassium citrate, ammonium citrate, magnesium citrate, lithium citrate and monosodium phosphate.

The preferred effective amount of the neutralizing agent is added to the reactor. The neutralization agent can be added to the reactor in any way. Preferably, the neutralizing agent is added in the form of a concentrate solution which depends upon the solubility of the base. Most preferably the neutralizing agent is in the form of a concentrated solution of 10–30%. Generally, an effective amount would be measured as one normal amount of base to one normal amount of acid or one gram equivalent base to one gram equivalent of acid. The preferred amount would be an amount in excess of one gram equivalent so that some residual remains. The residual should not exceed 0.5% or 5000 ppm. The neutralization generally takes place very quickly. That is, the neutralization is complete in less than fifteen minutes. During the neutralization, the temperature in the reactor ranges from approximately 30 to approximately 80 degrees centigrade.

It is believed that the non-gassing neutralizing agent used in the instant invention can go within the CPVC resin pores and effectively neutralize any hydrogen chloride trapped within these pores. In contradistinction, conventional neutralizing agents form gas bubbles around the resin pores which prevent the neutralizing agent from effectively neutralizing any trapped hydrogen chloride or unreacted chlorine in the CPVC pores.

During neutralization, the CPVC resin may be heated to aid in the neutralization. After the neutralization, the neutralized resin is cooled and dried.

This invention also relates to CPVC resin formed using the novel neutralizing method of the instant invention. The CPVC resin has increased stability. Moreover, the resin does not easily degrade, and the color of the resin generally improves.

The CPVC resin formed and neutralized by the novel method of the instant invention can be used for numerous rigid and semi-rigid vinyl polymer applications. Moreover, the CPVC resin can be blended with small amounts of another resin or rubber, e.g. chlorinated polyethylene, styrene-acrylonitrile copolymer or chlorinated polybutylene to improve its shock resistance and mechanical processability. In addition, pigments, lubricants, stabilizers, and other additives, including those additives well known in the art, may be added to the neutralized CPVC resin.

From the foregoing description, one skilled in the art can easily ascertain the essential characteristics of the invention and without departing from the spirit and significance thereof make various changes and modifications of the invention and adapt it to the various usages and conditions. Accordingly, the whole of the foregoing description is to be construed in an illustrative and not in a limitive sense, for the scope of the invention is defined solely by the appended claims.

EXAMPLES

Example 1

FIG. 1 illustrates the results from our modified HCl Elimination Test. The test procedure used is similar to ASTM D 793-49 and the equipment used is similar to the Methrohm Rancimat Model 679. The sample is heated at a constant temperature and is swept by a nitrogen stream with the exhaust gas being analyzed for hydrogen chloride by the use of a conductivity meter. From the change in conductivity it is possible to determine how much hydrogen chloride is being liberated from the polymer. The graph shows no change for the first 30 minutes. During this time, it is believed water is being driven off the polymer. After this initial time, the standard sample shows a tremendous rise in the hydrogen chloride measured, but the other samples do not. The hydrogen chloride, which boils at 110 degrees Centigrade comes off only after the lower boiling water (100 degrees Centigrade) comes off. The slight rise in the sodium phosphate neutralized sample is due to the strength of that base. The phosphate base neutralizes all the acid without gassing, but the pH of the basic solution is too high and results in polymer degradation. Therefore the graph in FIG. 1 clearly shows that the standard neutralization scheme using sodium carbonate does not neutralize all the acid generated during chlorination of PVC polymer.

Example 2

Figure 2:
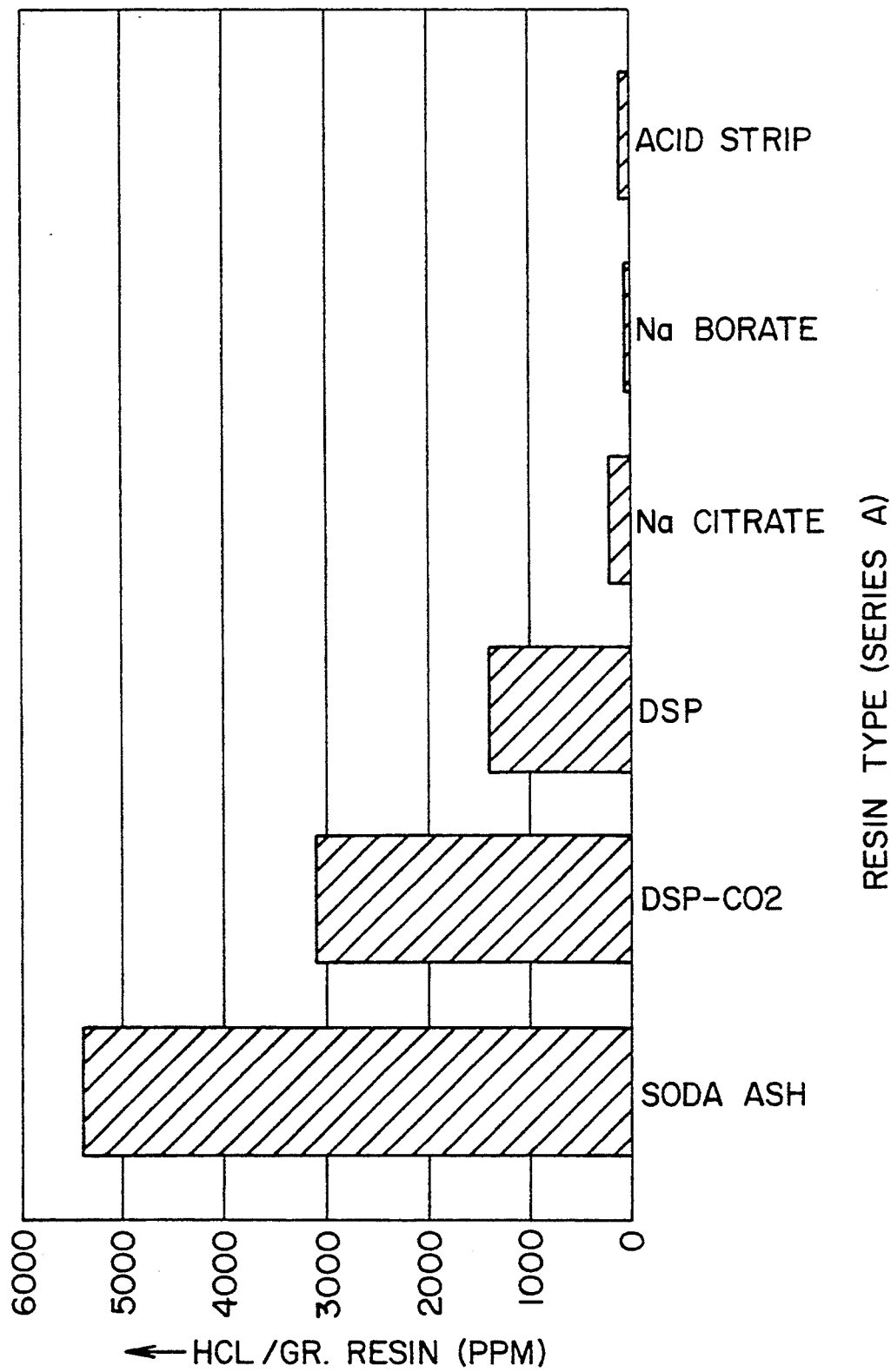
FIG. 2 illustrates the amount of hydrogen chloride neutralized over the length of time of neutralization in CPVC.

FIG. 2 illustrates the amounts of hydrogen chloride over the same length of time for a variety of schemes for neutralization. The first bar for soda ash shows that the hydrogen chloride is trapped in the pores of the polymer. The sample labeled DSP-CO2 was treated with sodium carbonate before neutralizing with the phosphate. In this case, the non-gassing phosphate could not neutralize the hydrogen chloride because the pretreatment by carbonate had produced gas bubbles that blocked the phosphate from entering the polymer pores. The sample that was neutralized by DSP without the pretreatment was considerably lower is residual hydrogen chloride. In addition, the citrate and borate samples have very low residual hydrogen chloride levels indicating the complete neutralization of the acid. The last bar is for acid stripping before neutralization, in this case, the acid can be removed by boiling it out.

Example 3

Figure 3:
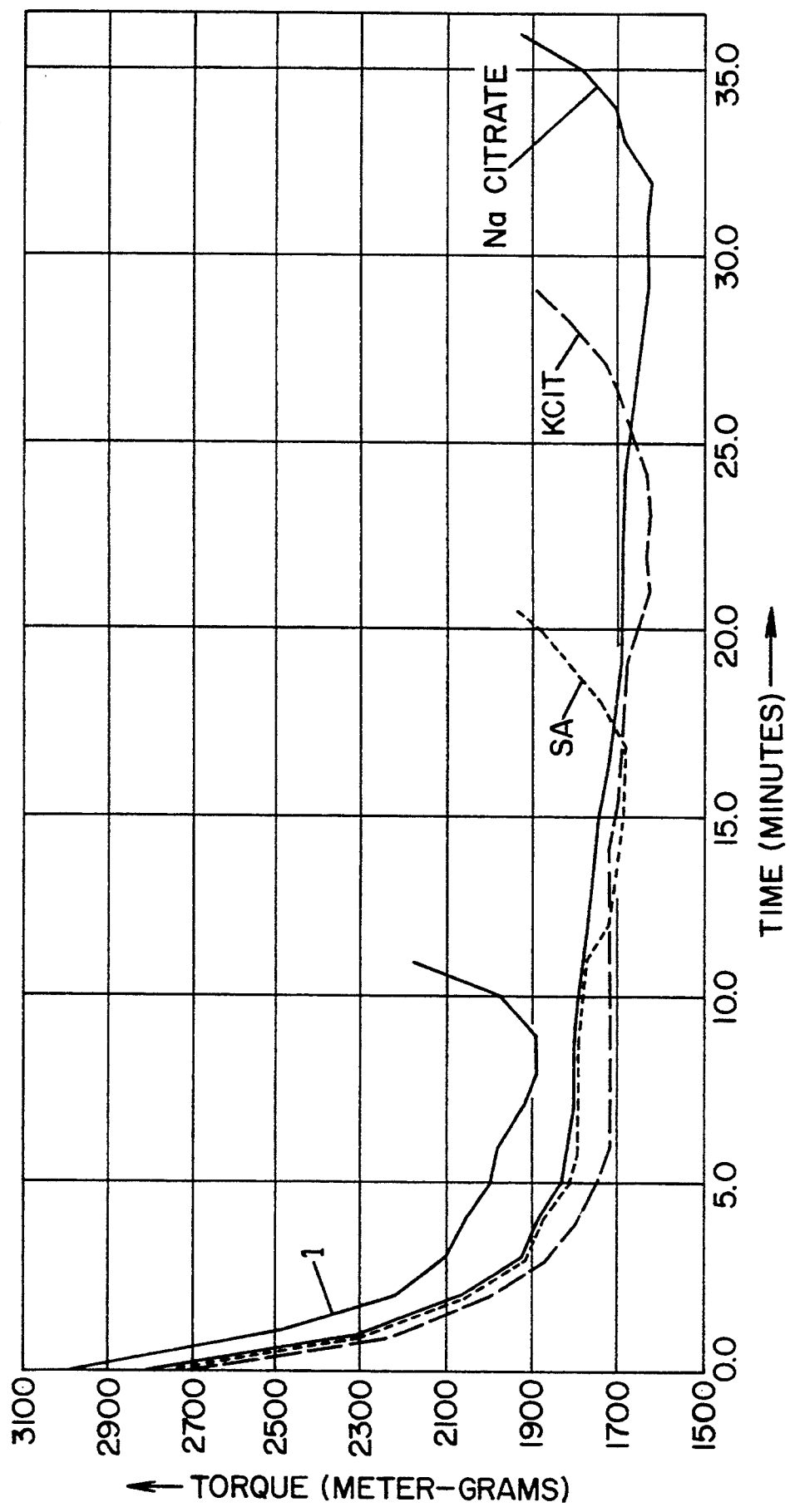
FIG. 3 shows the increased stability of the CPVC polymer using the neutralizing agent of the present invention as compared to other neutralizing agents.

The final example shows the increase in stability due to the residual potassium and sodium citrate on the dry resin when exposed to the shear and heating in the Brabender Dynamic Thermal Stability test. This test is performed in accordance with ASTM D-2530-88 test. The stability as defined by this test, tells the operator how long the resin can be melt-mixed before catastrophic degradation occurs. The results on the Example are illustrated in FIG. 3. The graph in FIG. 3 clearly shows that the sodium citrate neutralized sample is more stable than any sample subjected to the other treatments. The curve is that of a torque developed by a resin, a lubricant and a stabilizer in a Brabender mixer heated to 210 C. The initial peak is related to the initial breaking down of the particle until it becomes a melt. The melt continues along a fairly level torque until the resin has degraded enough that crosslinking occurs, at which point the torque again begins to rise. The stability of the polymer is normally determined as a certain amount of torque above the minimum.

Example 4

Example 4 gives the results of Dynamic Thermal Stability ("DTS") testing. In accordance with ASTM D 2538-88. This test measures the point the material begins to degrade by measuring the torque of the material. The test results for various neutralizing agents are listed in Table 1 below. Table 1 gives the DTS times, the inherent viscosity of the samples tested and percent chlorine of the samples.

TABLE 1

| Sample | Sodium Carbonate | Sodium Phosphate | Sodium Borate | Sodium Citrate | Potassium Citrate | I.V. | % e |
| --- | --- | --- | --- | --- | --- | --- | --- |
| 1 | 11.1 | | | 11.8 | 11.0 | 1.07 | 67.9 |
| 2 | 9.7 | | | 16.3 | 9.9 | 0.92 | 67.3 |
| 3 | 6.7 | | | 10.7 | 10.9 | 0.84 | 68.0 |
| 4 | 11.9 | | | 18.1 | 13.5 | 0.84 | 63.6 |
| 5 | 11.3 | | | 18.4 | 13.4 | 0.68 | 67.2 |
| 6 | 14.6 | | | 32.4 | 22.6 | 0.68 | 63.4 |
| 7 | 16.6 | | | 24.9 | 20.0 | 0.68 | 63.3 |
| 8 | 18.4 | | | 34.2 | 27.6 | 0.68 | 63.3 |
| 9 | 13.2 | | | 20.0 | 13.6 | 0.66 | 63.4 |
| 10 | 7.4 | 6.8 | | | 8.9 | 0.68 | 69.2 |
| 11 | 9.6 | 15.2 | | | 13.0 | 0.68 | 68.4 |
| 12 | 13.9 | | | | | 0.68 | 67.0 |
| 13 | | 18.3 | | | | 0.68 | 67.4 |
| 14 | | | 8.0 | | | 0.68 | 67.0 |
| 15 | | | | 22.2 | | 0.68 | 67.5 |

The Table illustrates, the longer the DTS time, the more stable the material. As seen by the results the potassium citrate and sodium citrate neutralizing agents had substantially longer DTS times than other neutralizing agents.

We claim:

1. A method for the neutralization of chlorinated polyvinyl chloride resin to increase the stability of said chlorinated polyvinyl chloride resin comprising chlorinating polyvinyl chloride resin and neutralizing the chlorinated polyvinyl chloride resin by the addition of a neutralizing agent, wherein the neutralizing agent is a weak non-gassing base, wherein the weak non-gassing base is a soluble citrate.

2. A method as claimed in claim 1, wherein the weak non-gassing base has a pKa of less than 7.0 and is not a carbonate.

3. A method as claimed in claim 1, wherein the weak non-gassing base is selected from the group comprising potassium citrate, sodium citrate, ammonium citrate, magnesium citrate, and lithium citrate.

4. A method as claimed in claim 1 wherein said soluble citrate is selected from the group comprising potassium citrate, sodium citrate, ammonium citrate, magnesium citrate and lithium citrate.

* * * * *